United States Patent
Johnson et al.

(10) Patent No.: US 10,765,061 B2
(45) Date of Patent: Sep. 8, 2020

(54) COVER ATTACHMENT FOR LAWNMOWER CUTTER HOUSING

(71) Applicant: HONDA MOTOR CO., LTD., Tokyo (JP)

(72) Inventors: Timothy Justin Johnson, Greensboro, NC (US); Surender Kumar, Mebane, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 137 days.

(21) Appl. No.: 16/050,965

(22) Filed: Jul. 31, 2018

(65) Prior Publication Data
US 2020/0037501 A1    Feb. 6, 2020

(51) Int. Cl.
*A01D 34/81*    (2006.01)
*A01D 34/69*    (2006.01)
*A01D 101/00*   (2006.01)

(52) U.S. Cl.
CPC ............. *A01D 34/81* (2013.01); *A01D 34/69* (2013.01); *A01D 2101/00* (2013.01)

(58) Field of Classification Search
CPC ........ A01D 34/81; A01D 34/69; A01D 34/66; A01D 34/828; A01D 34/63; F04B 23/00; F04B 53/16
USPC ...... 56/320.1, 320.2; 74/41, 606 R; 474/146, 474/150, 313
See application file for complete search history.

(56) References Cited

U.S. PATENT DOCUMENTS

| | | | |
|---|---|---|---|
| 3,646,739 A | 3/1972 | Dahl | |
| 5,953,890 A | 9/1999 | Shimada et al. | |
| 5,957,796 A * | 9/1999 | McLean | F04B 23/00 417/313 |
| 7,735,305 B1 | 6/2010 | Cozine et al. | |
| 8,763,355 B2 * | 7/2014 | Sugio | A01D 34/81 56/255 |
| 9,699,966 B2 * | 7/2017 | Shaver | A01D 34/81 |
| 2003/0182919 A1 | 10/2003 | Baumann et al. | |

FOREIGN PATENT DOCUMENTS

| | | |
|---|---|---|
| CN | 103477790 A | 1/2014 |
| EP | 1 285 570 A1 | 2/2003 |
| EP | 1 797 752 A1 | 6/2007 |
| EP | 3 241 422 A1 | 11/2017 |

OTHER PUBLICATIONS

Communication dated Jan. 3, 2020, from the European Patent Office in counterpart European Application No. 19179685.3.

* cited by examiner

*Primary Examiner* — Robert E Pezzuto
(74) *Attorney, Agent, or Firm* — Arent Fox LLP

(57) ABSTRACT

A lawnmower includes a belt cover attached to a cutter housing via one or more interlocking tabs and pockets. The lawnmower may include a cutter mounted to a shaft oriented in a vertical direction. The lawnmower may include a rear axle oriented in a horizontal direction. The lawnmower may include a cutter housing defining a lower opening below the cutter, a belt opening between the shaft and the rear axle, and at least one discharge opening. The lawnmower may include a belt cover including a ring portion at least partially surrounding the shaft above the cutter and a guard portion extending toward the belt opening. The belt cover may include at least one tab that engages a corresponding pocket on the cutter housing adjacent the belt opening.

20 Claims, 10 Drawing Sheets

US 10,765,061 B2

COVER ATTACHMENT FOR LAWNMOWER CUTTER HOUSING

TECHNICAL FIELD

Aspects of the present disclosure relate to power equipment and methods of assembly thereof, and in particular to systems, devices and methods of assembling a lawnmower.

BACKGROUND

Lawnmowers offer various options for handling clippings of the cut grass. A mulching option restricts the clippings from leaving a cutter housing such that the cutter repeatedly cuts the clippings and reduces their size. The small clippings eventually exit the cutter housing via a lower opening. A bagging option utilizes a discharge chute, typically located at a rear of the cutter housing.

A self-propelled lawnmower may include a single engine that rotationally drives a shaft. A cutter may be releasably engaged to the shaft to rotate the cutter for cutting grass. A transmission may be coupled to the shaft via a belt to rotate an axle or one or more drive wheels. The belt is typically located above the cutter. To reduce damage and wear to the belt and transmission, the belt is typically shielded from the cutter and grass clippings by a belt cover. Conventional belt covers may be integrated with a cutter housing. While secure, such integrated belt covers make service of the belt inconvenient.

In view of the foregoing, there is a need for improved self-propelled lawnmower systems. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a lawnmower. The lawnmower may include a cutter mounted to a shaft oriented in a vertical direction. The lawnmower may include a rear axle oriented in a horizontal direction. The lawnmower may include a cutter housing defining a lower opening below the cutter, a belt opening between the shaft and the rear axle, and at least one discharge opening. The lawnmower may include a belt cover including a ring portion at least partially surrounding the shaft above the cutter and a guard portion extending toward the belt opening. The belt cover may include at least one tab that engages a corresponding pocket on the cutter housing adjacent the belt opening.

In another aspect, the disclosure provides a belt cover for a self-propelled lawnmower. The belt cover may include a ring portion at least partially surrounding a cutter shaft above a cutter. The belt cover may include a guard portion extending rearward toward a belt opening in a rear wall of a cutter housing, wherein the belt cover includes at least one tab extending rearward that engages a corresponding pocket on the rear wall of the cutter housing.

In another aspect, the disclosure provides a method of assembling a lawnmower. The method may include mounting a motor having a motor shaft on top of a cutter housing, the cutter housing defining a lower opening, a belt opening between the motor shaft and a rear axle, and at least one discharge opening. The method may include mounting a belt on the motor shaft and on a transmission coupled to the rear axle. The method may include providing a belt cover including a ring portion at least partially surrounding the motor shaft, the belt cover including a guard portion extending rearward toward the belt opening below the belt, wherein the guard portion includes at least one tab extending from a rearward edge. The method may include inserting the at least one tab into a corresponding pocket on the cutter housing adjacent the belt opening. The method may include securing the ring portion to a bottom surface of the cutter housing with a plurality of fasteners.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

It should be understood that the description and drawings herein are merely illustrative and that various modifications and changes can be made in the structures disclosed without departing from the present disclosure. In general, the figures of the example lawnmower are not to scale. As used herein, lateral directions are transverse across the lawnmower, i.e., left and right directions. Likewise, longitudinal directions refer to forward and rearward directions of lawnmower travel, and the vertical directions relate to elevation, i.e., upward and downward directions. It will also be appreciated that the various identified components of the example vehicle door system disclosed herein are merely terms of art that may vary from one manufacturer to another and should not be deemed to limit the present disclosure.

Generally described, the present disclosure provides for a lawnmower including a belt cover that is releasably coupled to a cutter housing using at least one tab that engages a respective pocket on the cutter housing. The engagement of the tab and the respective pocket prevents the belt cover from moving horizontally, axially, and vertically. In an aspect, the belt cover includes a ring portion that at least partially surrounds a cutter shaft and a guard portion that extends toward the belt opening to shield the belt from the cutter.

Figure 1:
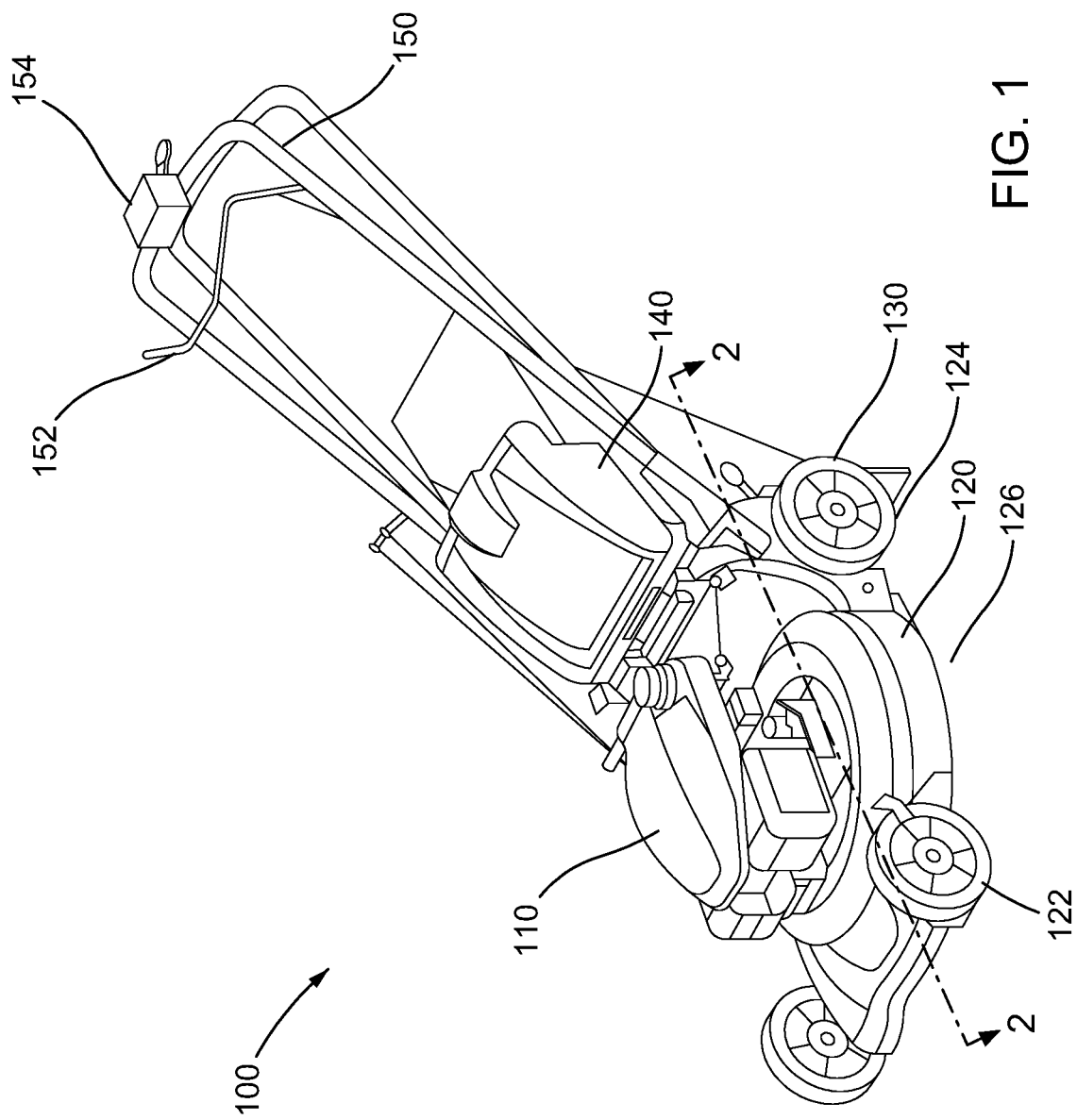
FIG. 1 is a perspective view of an example lawnmower, according to an aspect of the disclosure.

Turning to the figures, where like reference numbers refer to like components, FIG. 1 illustrates an example lawnmower 100. In an aspect, the lawnmower 100 may include some components of a conventional lawnmower. For example, the lawnmower 100 may include a motor 110, a cutter housing 120, front wheels 122, and rear wheels 124. The cutter housing 120 may be generally dome-shaped, defining a volume underneath for cutting grass. The cutter housing 120 may be supported on the front wheels 122 and rear wheels 124 such that a bottom edge is elevated and defines a lower opening 126 through which grass may enter the cutter housing. The cutter housing 120 may also be described an annular shape that includes a central opening, where the motor 110 is mounted. It should be appreciated that various shapes of lawnmower cutter housings known in the art may be adapted to accommodate a belt cover as discussed in further detail below.

The lawnmower 100 may also include a handle 150 including controls 154 and a dead-man switch 152 (or operator presence control). The controls 154 may control motor speed and/or transmission direction. The dead-man switch 152 may stop the motor, cutter, or transmission of the lawnmower 100 when not held by an operator. The lawnmower 100 may include a rear cover 140 that may be raised to permit the use of a bagging attachment and lowered when the bagging attachment is not in use. It should be appreciated that although depicted in an example arrangement, the conventional lawnmower components may be arranged or substituted according to other known designs or modified as appropriate for a particular goal. For example, the motor 110 may be an electric motor or a gasoline engine.

Figure 2:
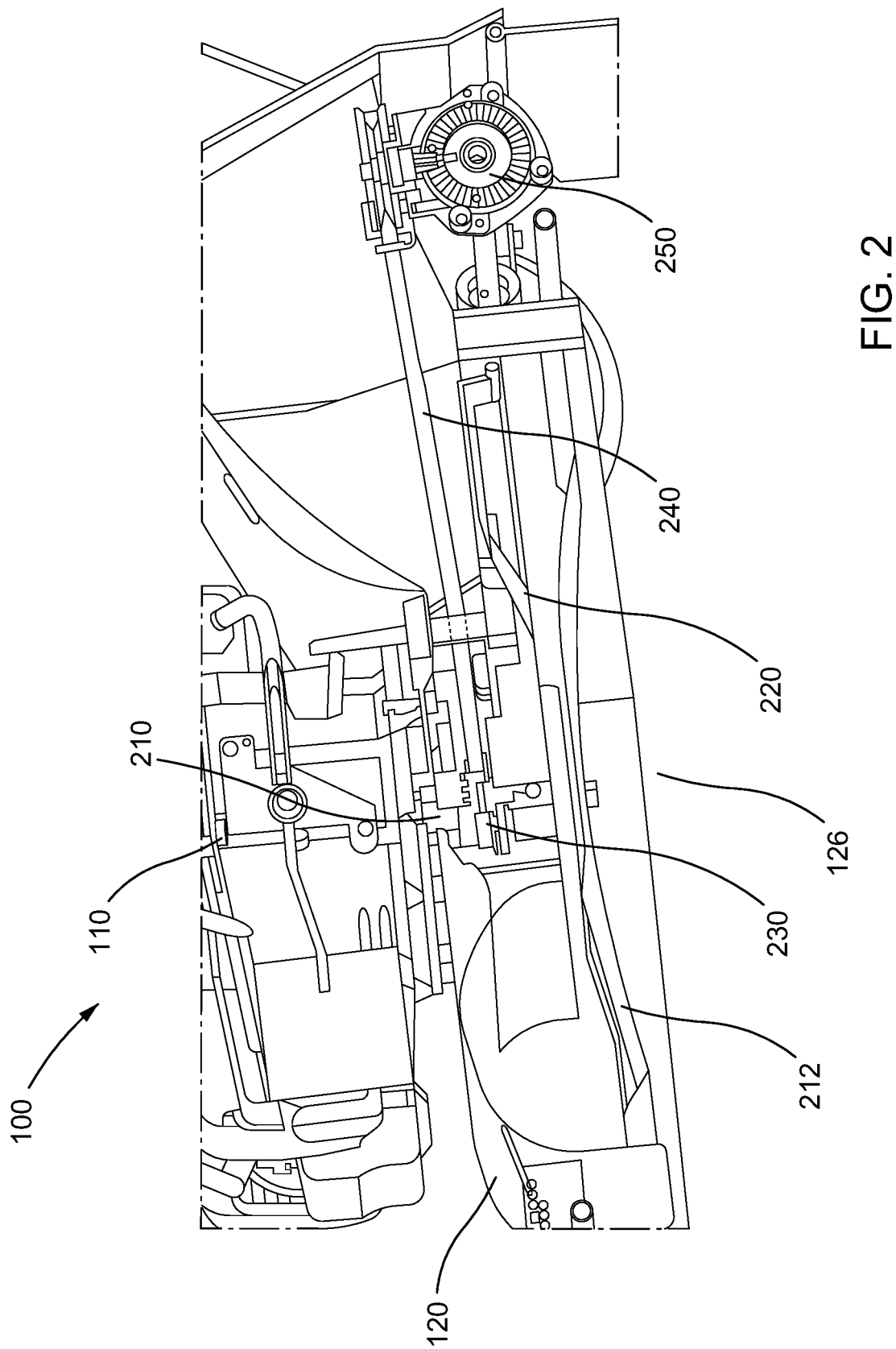
FIG. 2 is a longitudinal cross-section view of the example lawnmower of FIG. 1, according to an aspect of the disclosure.

FIG. 2 illustrates a longitudinal cross-sectional view of the example lawnmower 100 along the line 2-2. The motor 110 includes a shaft 210 that is rotationally driven by the motor 110. The shaft 210 may be oriented vertically and extend downward from the motor 110. The shaft 210, in turn, may rotate a cutter 212 mounted on the shaft 210. The cutter 212 may be, for example, a blade or a line. In an aspect, the dead-man switch 152 may rotationally couple the cutter 212 to the shaft 210 when the dead-man switch 152 is activated and rotationally decouple the cutter 212 from the shaft 210 when the dead-man switch 152 is released.

A pulley 230 may be mounted on the shaft 210 and rotationally driven by the motor 110. A belt 240 may be mounted on the pulley 230 and connect the pulley 230 to a transmission 250. The transmission 250 may releasably couple the belt to one or more rear wheels 124 (e.g., via a rear axle 252), to drive the lawnmower 100 in a forward or reverse direction. The controls 154 may control the transmission 250 to provide forward, reverse or neutral drive of the rear wheels 124 via the transmission 250.

In an aspect, a belt cover 220 may be positioned between the belt 240 and the cutter 212. The belt cover 220 may be generally flat and extend horizontally from an area surrounding the shaft 210 toward the transmission 250. The belt cover 220 may divide a volume under the cutter housing 120 into a cutting volume including the cutter 212 and a belt volume including the belt 240. The belt cover 220 may perform several functions. The belt cover 220 may protect the belt 240 and transmissions 250 from the cutter 212 and from debris (e.g., grass clippings) moving within the cutter volume. Without a belt cover 220, the debris may contact the belt 240 or transmission 250 and cause additional wear. Additionally or alternatively, the debris may stick to the belt 240 or transmission 250 and either lubricate the belt 240, thereby causing slippage, or clog the transmission 250. The belt cover 220 may reduce the amount of debris contacting the belt 240 and transmission 250. Additionally, the belt cover 220 may define a shape and aerodynamic properties of the cutting volume. The belt cover 220 may direct the movement of the debris within the cutting volume. In an aspect, the belt cover 220 may direct the debris toward a discharge port or chute, for example, for bagging. In another aspect, the belt cover 220 may block discharge to encourage recirculation of the debris within the cutting volume to reduce debris size for mulching. In an aspect, the present disclosure provides for a separate belt cover 220 that is removably coupled to the rear assembly via a plurality of tabs that engage pockets on the rear assembly. The disclosed separate belt cover 220 may allow easier access to the belt 240 while providing an effective shield against debris.

Figure 3:
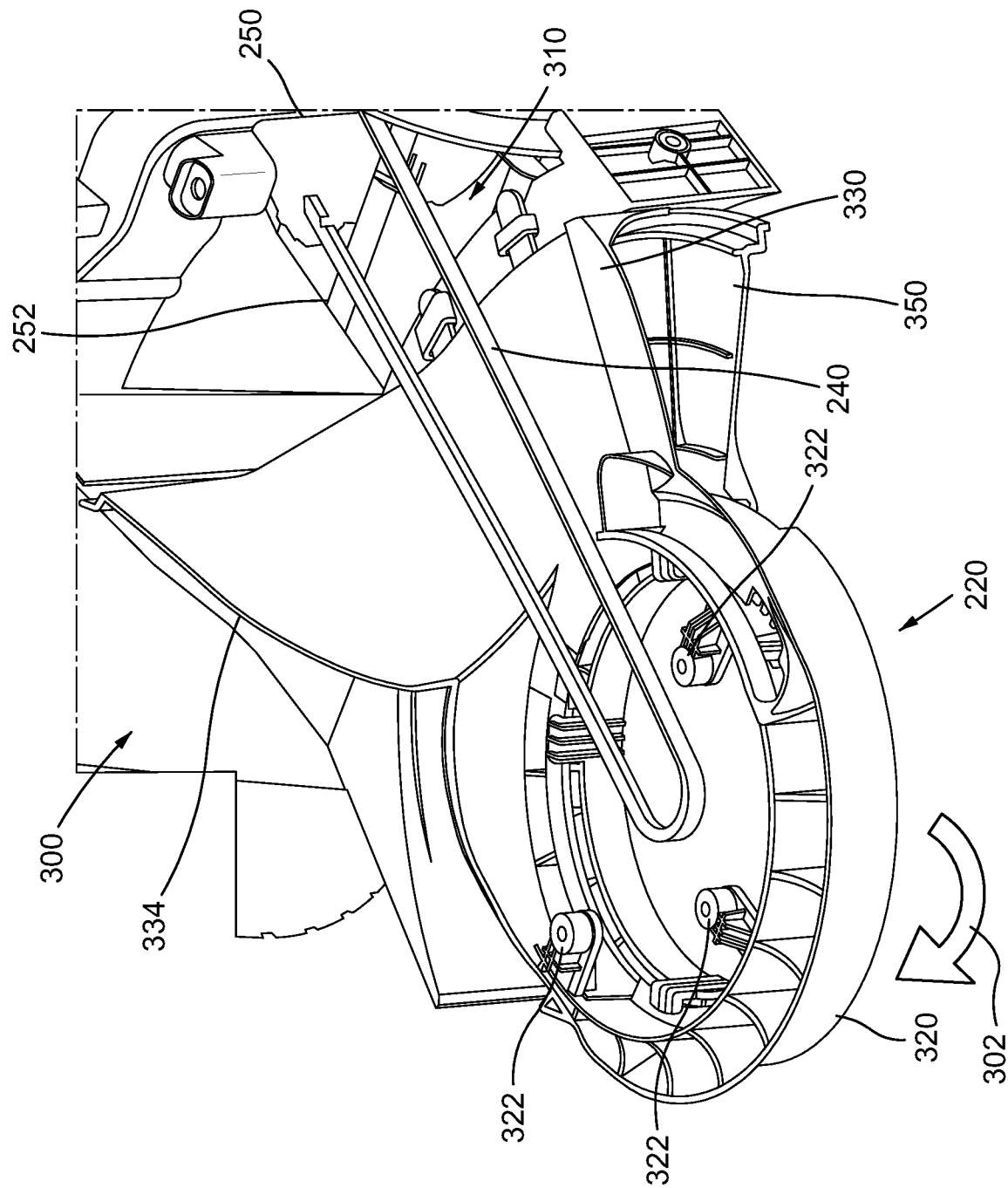
FIG. 3 is a perspective view of an example belt cover and example rear assembly, according to an aspect of the disclosure.
Figure 4:
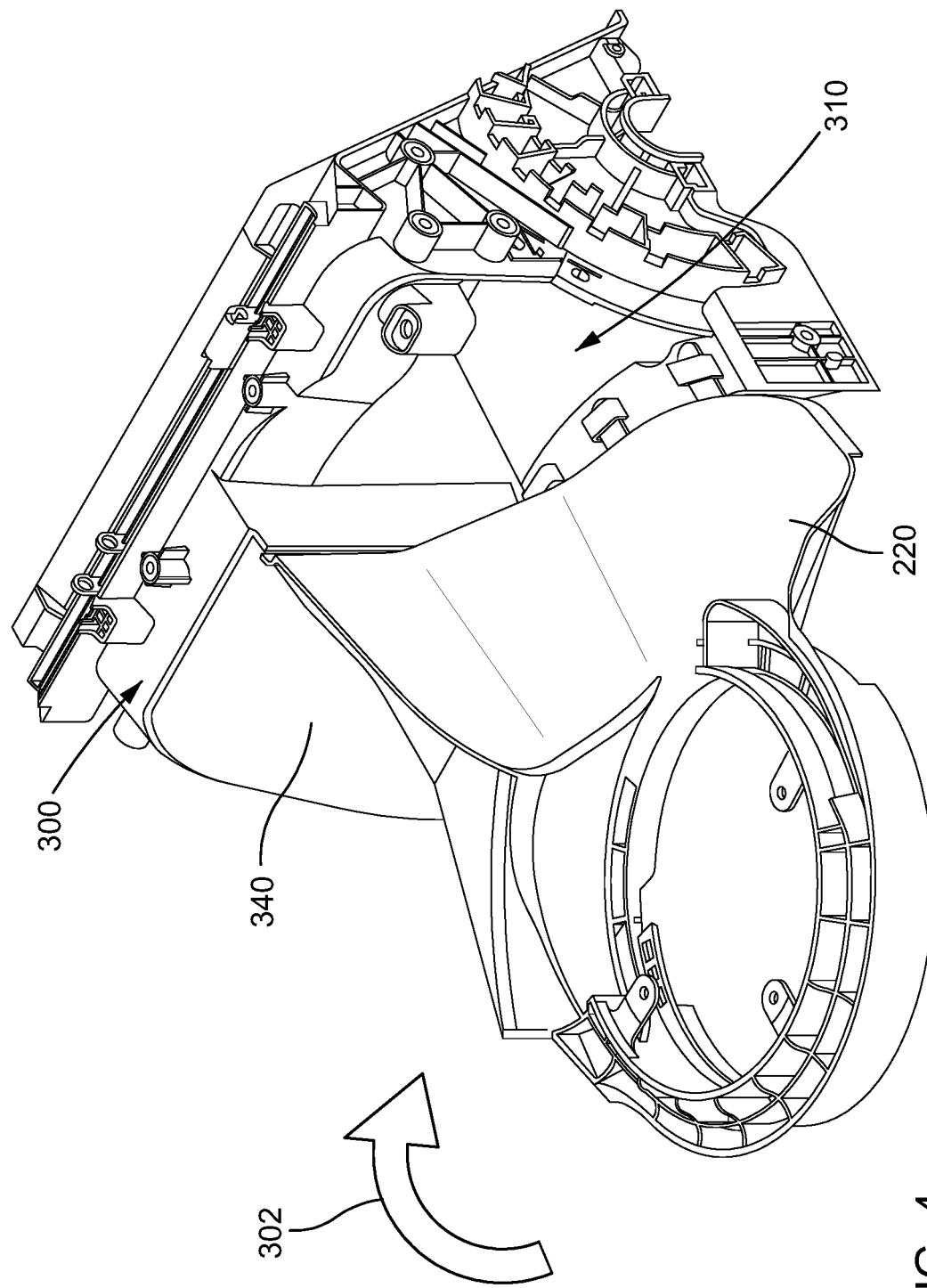
FIG. 4 is another perspective view of the example belt cover and rear assembly of FIG. 3
Figure 5:
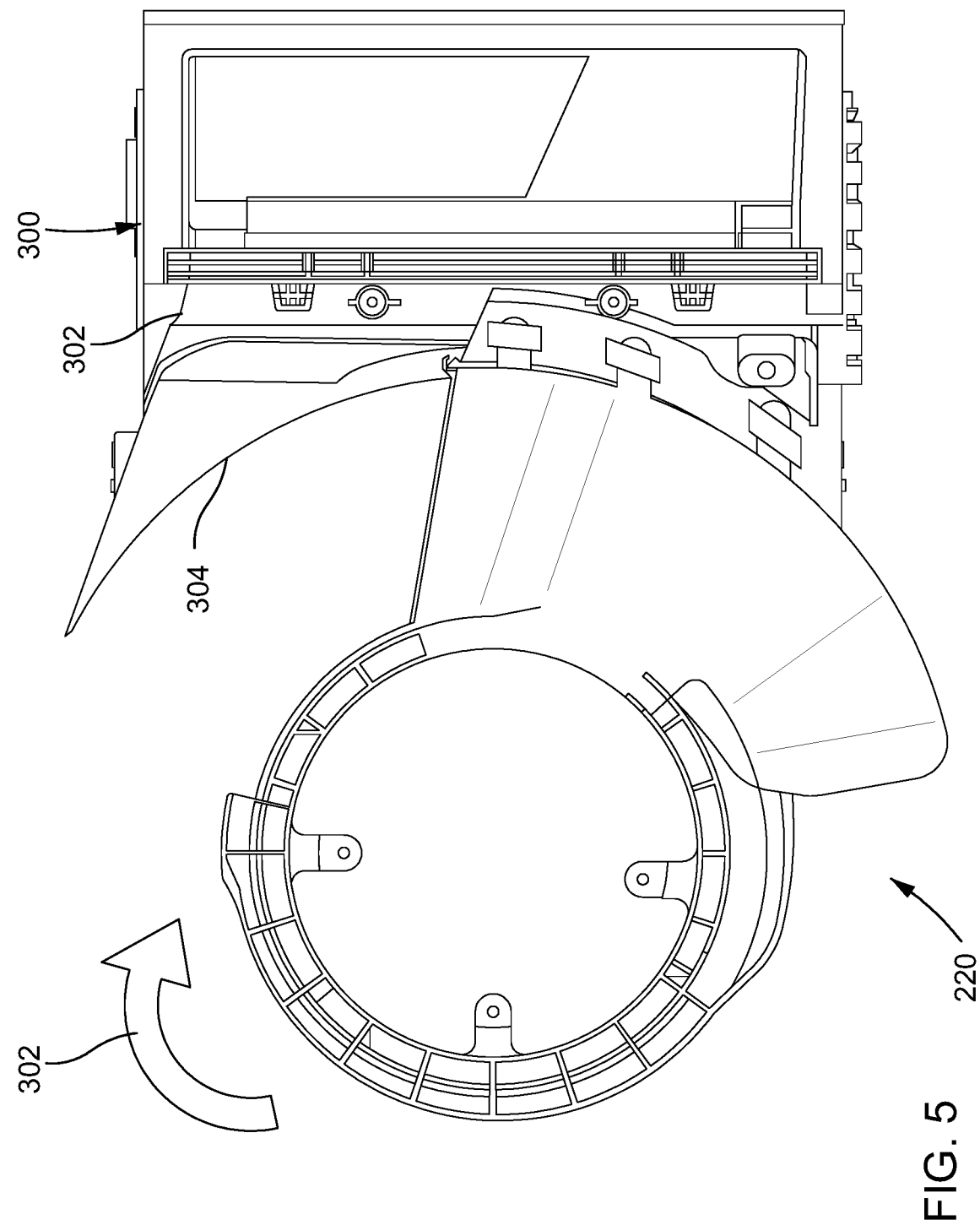
FIG. 5 is a top view of the example belt cover and rear assembly of FIG. 3
Figure 6:
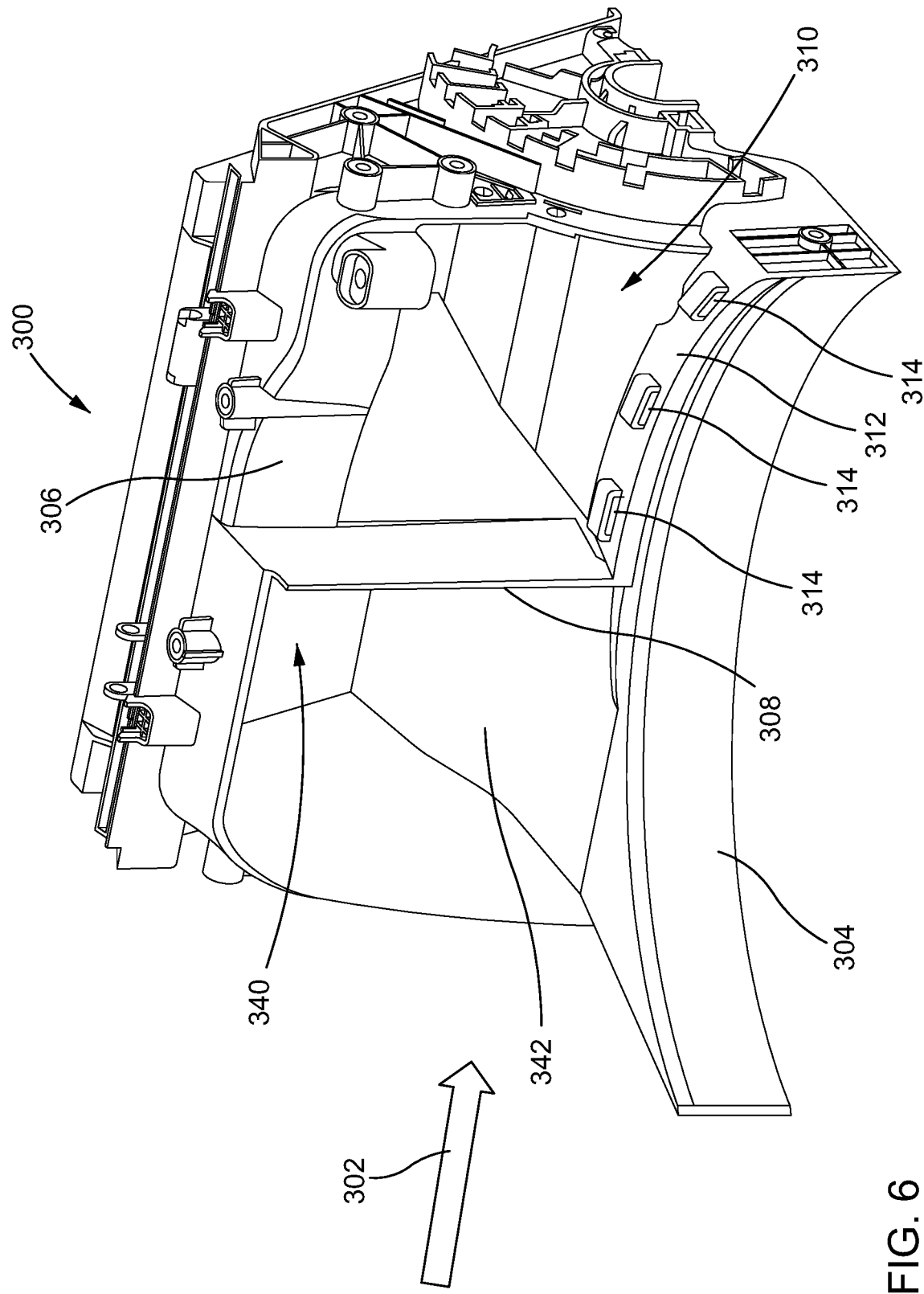
FIG. 6 is a perspective view of an example rear assembly, according to an aspect of the disclosure.
Figure 7:
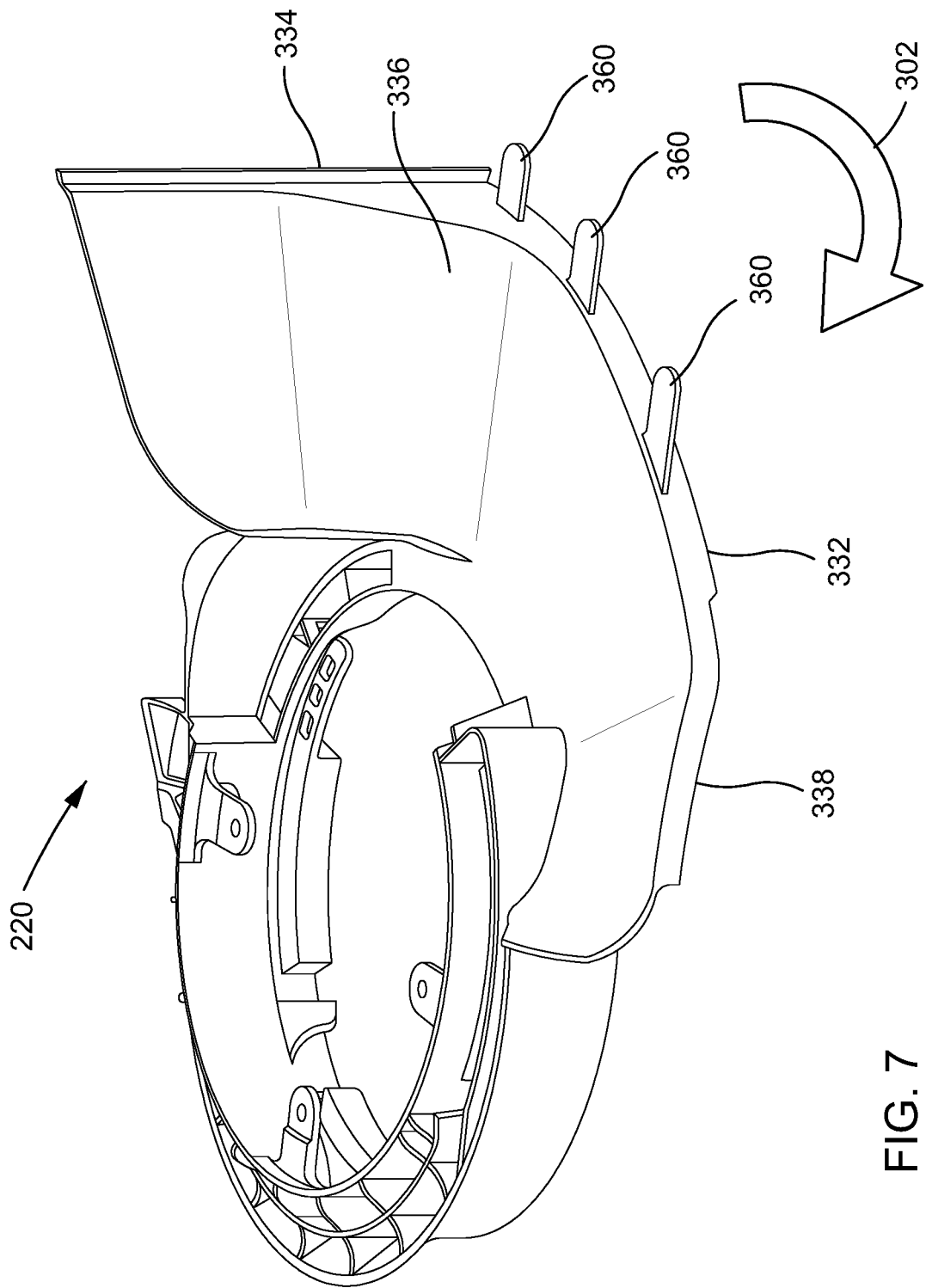
FIG. 7 is a perspective view of an example belt cover, according to an aspect of the disclosure.

FIGS. 3-7 illustrate an example belt cover 220 and an example rear assembly 300. FIG. 3 is a perspective view of the example belt cover 220 mounted to the rear assembly 300. FIG. 4 is an additional perspective view of the example belt cover 220 and rear assembly 300. FIG. 5 is a top view of the example belt cover 220 and rear assembly 300. FIG. 6 is a perspective view of the example rear assembly in isolation. FIG. 7 is a perspective view of the example belt cover 220 in isolation. The rear assembly 300 may form a rear portion of the cutter housing 120. For example, the rear assembly 300 may be mounted to a metal dome portion of the cutter housing 120. The belt cover 220 and the rear assembly 300 may be separately molded from a high-strength plastic such as, for example, polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof.

The rear assembly 300 may form a rear wall 302 of the cutting volume. The rear wall 302 may include a lower portion 304 that is located below the cutter 212 and an upper portion 306 located above the cutter 212. The rear assembly 300 may also support the transmission 250, rear wheels 124, and handle 150 at various locations behind the rear wall 302. The rear assembly 300 may include a belt opening 310 that allows the belt 240 to pass through the rear wall to the transmission 250. The belt opening 310 may be located above the lower portion 304.

The rear assembly 300 may include a discharge chute 340 extending through the rear wall 302. The discharge chute 340 may be located, for example, above the lower portion 304. The discharge chute 340 may share a common wall 308 with the belt opening 310. The discharge chute 340 may include a lower surface 342 that inclines upwardly from the lower portion 304 to a rearward edge of the discharge chute 340.

In an aspect, the cutter 212 may rotate in a clockwise direction 316 when viewed from the top. The discharge chute 340 may be located before the belt opening 310 in the clockwise direction 316.

A top surface 312 of the lower portion 304 may include a plurality of pockets 314. For example, in the illustrated example, the top surface 312 may include three pockets 314.

The belt cover 220 may include a ring portion 320 and a guard portion 330. The ring portion 320 may surround the shaft (not shown). The ring portion 320 may include mounting holes 322 for mounting the belt cover 220 to the cutter housing 120 via fasteners (not shown). In an aspect, the fasteners may be inserted from the top through the cutter housing 120 such that the fasteners do not fall into the cutting volume if they become loose.

The guard portion 330 may have a relatively flat bottom surface 332 that is located above the cutter 212 at approximately the same height at the top surface 312 of the lower portion 304. The bottom surface 332 may prevent debris from rising upward to contact the belt 240. The bottom surface 332 may include an incline portion 338 that is located past the belt 240 in the clockwise direction 316. The incline portion 338 may extend upward to a bottom surface of the cutter housing. The incline portion 338 may allow debris to move upwards (toward the discharge chute 340) as the debris travels in the clockwise direction 316. The guard portion 330 may also include a vertical wall 334 forming a leading edge of the guard portion 330 in the clockwise direction 316. The vertical wall 334 may prevent debris that is above the cutter 212 and passes the discharge chute 340 from contacting the belt 240. The vertical wall 334 may direct such debris into the discharge chute 340 or downward below the bottom surface 332. The vertical wall 334 may contact the common wall 308 of the rear assembly 300 to form a continuous wall.

In an aspect, the belt cover 220 may include an optional adjustment portion 350. The adjustment portion 350 may be mounted to the ring portion 320, for example, via curved arms that engage and slide along an inner top edge of the ring portion 320. The adjustment portion 350 may rotate with respect to the ring portion 320 to alter the shape of the belt cover 220. In an aspect, for example, the adjustment portion 350 may be positioned in a first position that blocks a discharge chute or a second position that opens the discharge chute.

Figure 9:
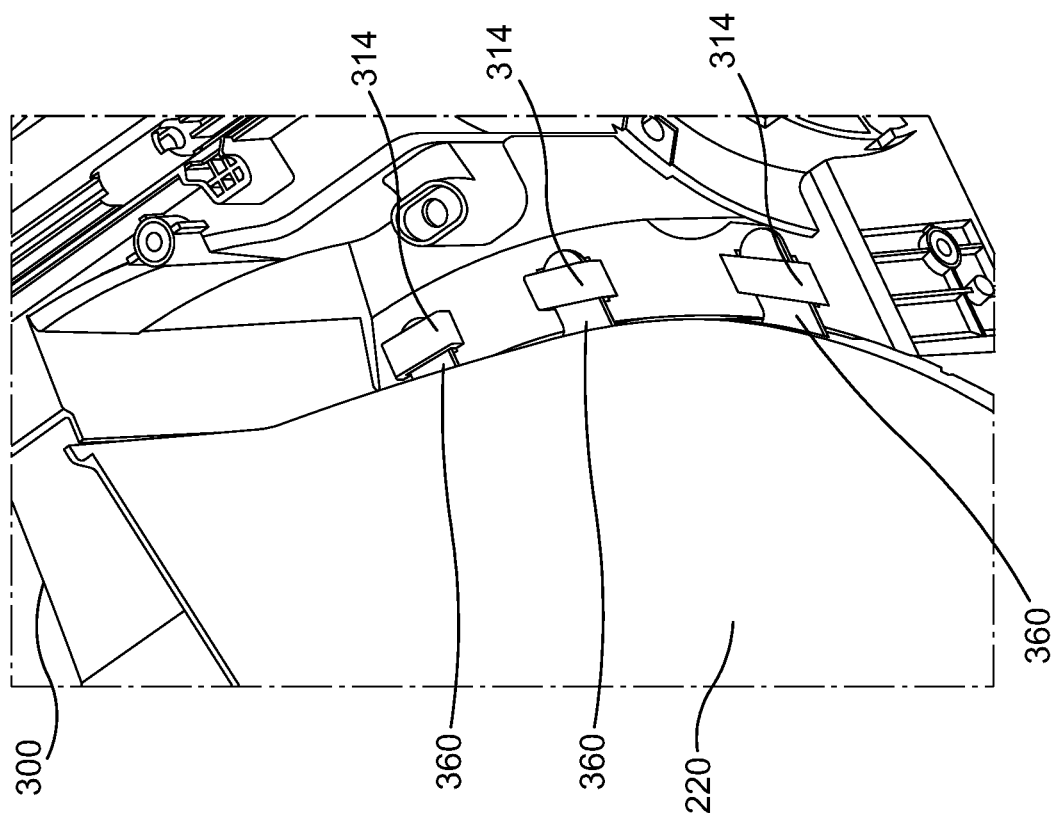
FIG. 9 is a perspective view of example of engaged tabs and pockets, according to an aspect of the disclosure.
Figure 8:
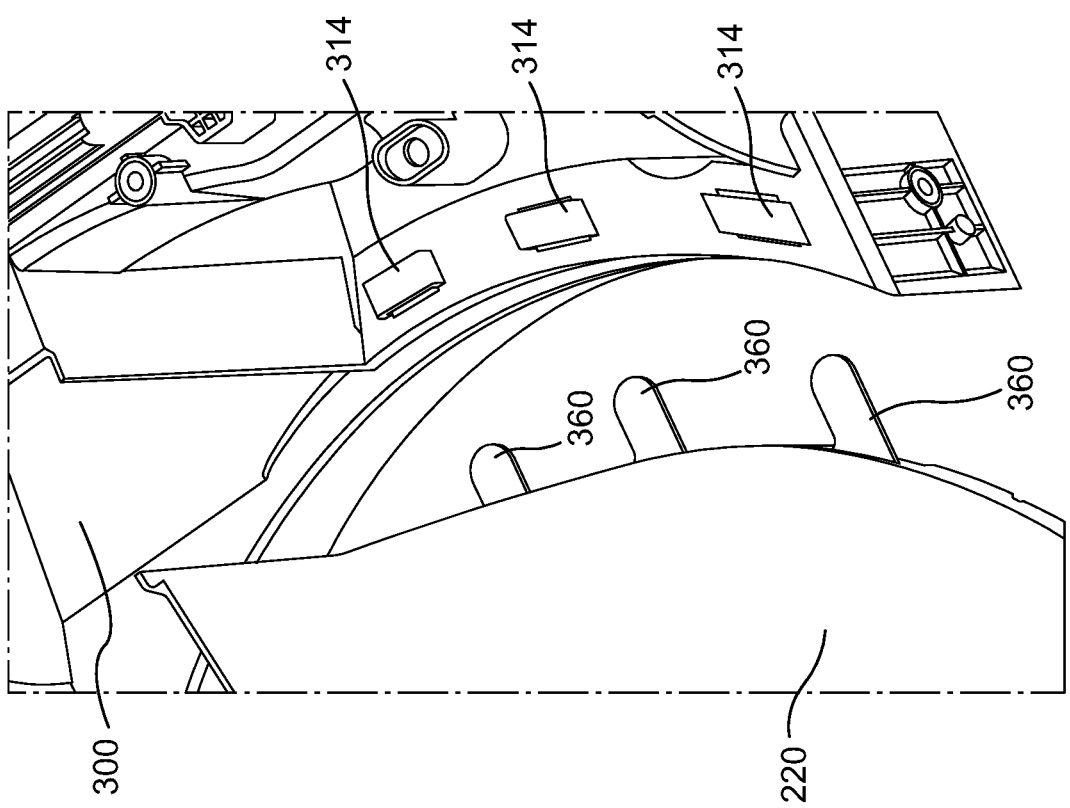
FIG. 8 is a perspective view of example of disengaged tabs and pockets, according to an aspect of the disclosure.

FIG. 8 illustrates an interface between the belt cover 220 and the rear assembly 300. The belt cover 220 may include a plurality of tabs 360 extending rearwardly from a rearward edge of the guard portion 330. Each tab 360 may have a rounded leading edge. In an aspect, each tab 360 may be approximately one inch long and one-half inch wide, although other dimensions are possible. A top surface 312 of the lower portion 304 may include a plurality of pockets 314. For example, in the illustrated example, the top surface 312 may include three pockets 314. Each tab 360 may engage a corresponding pocket 314 as illustrated in FIG. 9. For example, each tab 360 may slide into the pocket 314 and form an interference fit with the top surface 312 and the pocket 314. A portion of each tab 360 may extend out a rear edge of the corresponding pocket 314.

Figure 10:
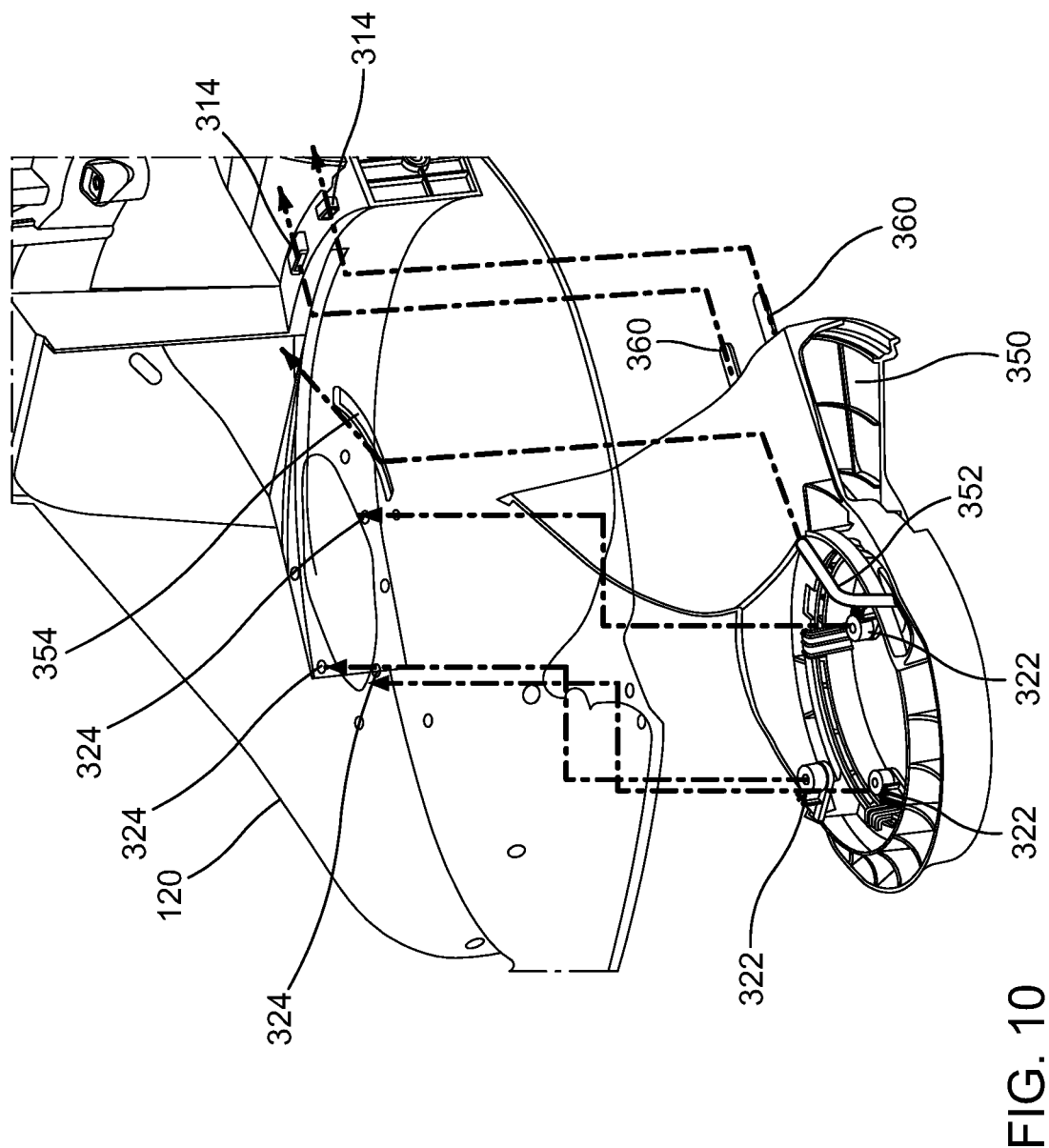
FIG. 10 is a perspective view showing assembly of an example belt cover and lawnmower cutter housing, according to an aspect of the disclosure.

FIG. 10 illustrates assembly of the belt cover 220 with the cutter housing 120 and rear assembly 300. The tabs 360 may be inserted into a corresponding pocket 314. Insertion of a tab 360 into a pocket may not require any tool. In an aspect where the adjustment portion 350 is included, an adjustment lever 352 may be inserted through a slot 354 in the cutter housing 120. Each of the mounting holes 322 may be aligned with a corresponding opening 324 in the cutter housing 120. A fastener may be inserted through each opening 324 and corresponding mounting hole 322 to secure the belt cover 220 to the cutter housing 120. For example, a bolt may be inserted from the outside of the cutter housing 120 such that the bold will not fall into the cutting volume if the bolt becomes loosened by vibration of the motor 110.

The tabs 360 may prevent horizontal, vertical, and rotational movement of the guard portion 330. In particular, when the tabs 360 extend through the pockets 314 in the rearward direction, the sides of the tabs contact the sides of the pocket to oppose forces exerted in the clockwise direction 316 (e.g., by debris contacting the vertical wall 334). Additionally, the top surface of the tabs 360 may contact a bottom surface of the pocket 314 to oppose upward forces (e.g., from debris contacting the bottom surface 332). The mounting holes 322 of the ring portion 320 being secured to the cutter housing 120 may prevent the belt cover 220 from moving in a forward direction, thereby preventing the tabs 360 from pulling out of the pockets 314.

Figure 11:
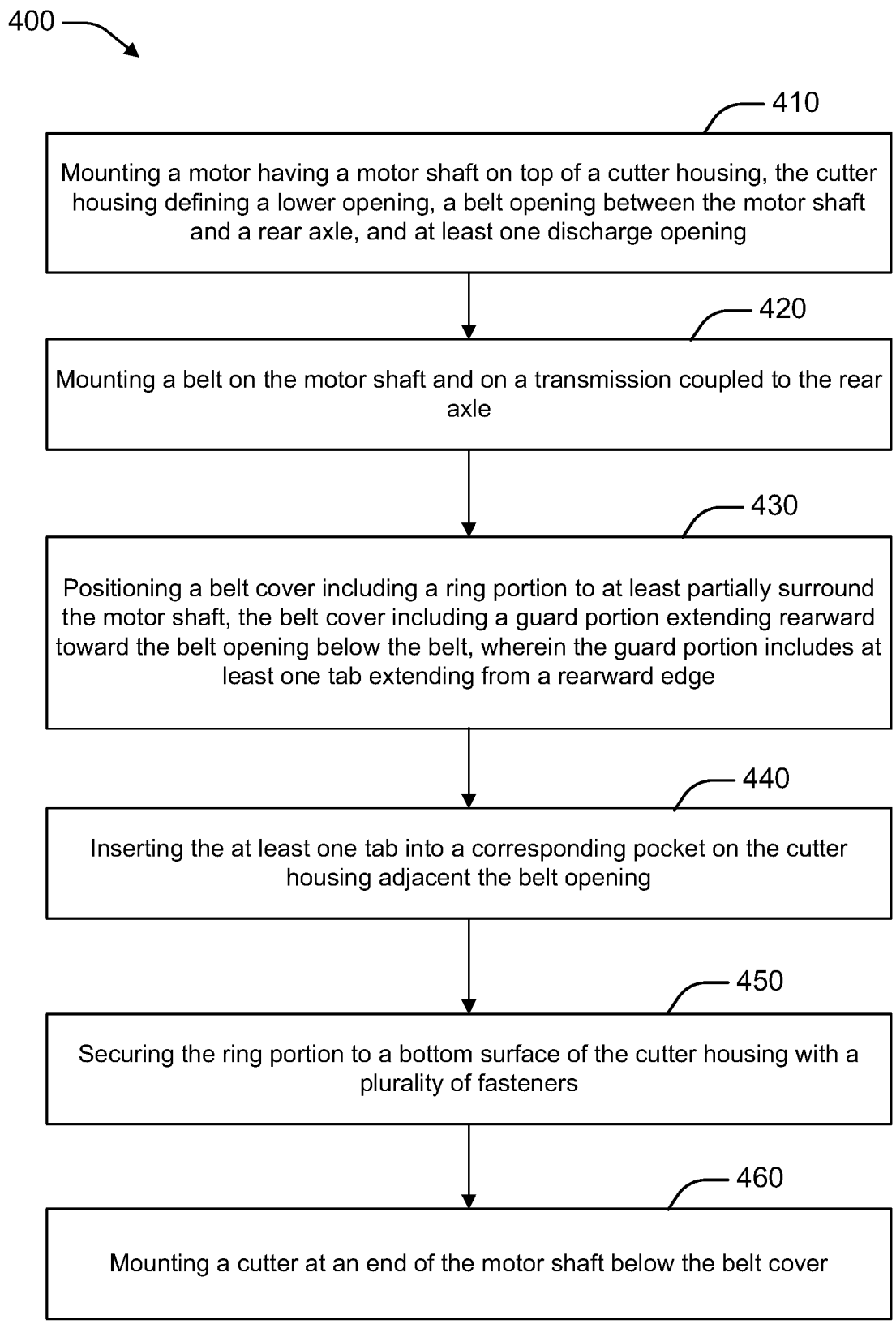
FIG. 11 is a flow diagram of an example method of assembling a lawnmower, according to an aspect of the disclosure.

FIG. 11 is a flow diagram of an example method 400 for assembling the lawnmower 100 including the belt cover 220. The method 400 may be performed by a technician or assembly robot.

At block 410, the method 400 may include mounting a motor having a motor shaft on top of a cutter housing, the cutter housing defining a lower opening, a belt opening between the motor shaft and a rear axle, and at least one discharge opening. In an aspect, for example, the technician or assembly robot may mount the motor 110 having the motor shaft 210 on top of the cutter housing 120. The cutter housing 120 may define a lower opening 126, belt opening 310 between the motor shaft 210 and a rear axle 252, and at least one discharge chute 340.

At block 420, the method 400 may include mounting a belt on the motor shaft and on a transmission coupled to the rear axle. In an aspect, for example the technician or assembly robot may mount the belt 240 on the motor shaft 210 and on the transmission 250, which is coupled to the rear axle 252 or at least one rear wheel 124.

At block 430, the method 400 may include positioning a belt cover including a ring portion to at least partially surround the motor shaft, the belt cover including a guard portion extending rearward toward the belt opening below the belt, wherein the guard portion includes at least one tab extending from a rearward edge. In an aspect, for example, the technician or assembly robot may position the belt cover 220 including a ring portion 320 to at least partially surround the motor shaft 210. The belt cover 220 may include a guard portion 330 extending rearward toward the belt opening 310 below the belt 240. The guard portion 330 may include at least one tab 360 extending from a rearward edge.

At block 440, the method 400 may include inserting the at least one tab into a corresponding pocket on the cutter housing adjacent the belt opening. In an aspect, for example, the technician or assembly robot may insert the at least one tab 360 into a corresponding pocket 314 on the cutter housing 120 adjacent the belt opening 310. In an aspect, the cutter housing 120 includes a rear assembly 300 defining the belt opening 310 and the corresponding pockets 314.

In block 450, the method 400 may include securing the ring portion to a bottom surface of the cutter housing with a plurality of fasteners. In an aspect, for example, the technician or assembly robot may secure the ring portion 320 to the bottom surface of the cutter housing 120 with a plurality of fasteners.

In block 460, the method 400 may include mounting a cutter at an end of the motor shaft below the belt cover. In an aspect, for example, the technician or assembly robot may mount the cutter 212 at the end of the motor shaft 210 below the belt cover 220.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A lawnmower, comprising:
   a cutter mounted to a shaft oriented in a vertical direction;
   a rear axle oriented in a horizontal direction;
   a cutter housing defining a lower opening below the cutter, a belt opening between the shaft and the rear axle, and at least one discharge opening;
   a belt cover including a ring portion at least partially surrounding the shaft below the cutter housing and above the cutter and a guard portion extending toward the belt opening, wherein the belt cover includes at least one tab that engages a corresponding pocket on the cutter housing adjacent the belt opening.

2. The lawnmower of claim 1, wherein the engagement between the at least one tab and the corresponding pocket constrains the belt cover in a vertical direction and a horizontal direction.

3. The lawnmower of claim 1, further comprising a belt located between the belt cover and the cutter housing, wherein the belt is mounted to the shaft and to a transmission operable to drive the rear axle or a wheel mounted thereto.

4. The lawnmower of claim 1, wherein the ring portion of the belt cover is mounted to the cutter housing via at least one fastener.

5. The lawnmower of claim 1, wherein the cutter housing comprises:
   a semi-annular top cover extending above and around the cutter to define the lower opening and a rear opening; and
   a rear assembly positioned within the rear opening and defining the belt opening and the at least one discharge opening.

6. The lawnmower of claim 5, wherein the rear assembly further defines a rear axle support that retains the rear axle.

7. The lawnmower of claim 5, wherein the rear assembly includes a common vertical wall separating the belt opening and the at least one discharge opening.

8. The lawnmower of claim 7, wherein the guard portion includes a vertical wall that contacts the common vertical wall of the rear assembly.

9. The lawnmower of claim 5, wherein the corresponding pocket extends upward from a lower surface of the belt opening.

10. The lawnmower of claim 1, wherein the at least one tab includes at least three tabs spaced along an edge of the guard portion.

11. A belt cover for a self-propelled lawnmower, comprising:
    a ring portion at least partially surrounding a cutter shaft above a cutter and below a cutter housing; and
    a guard portion extending rearward toward a belt opening in a rear wall of the cutter housing, wherein the belt cover includes at least one tab extending rearward that engages a corresponding pocket on the rear wall of the cutter housing.

12. The belt cover of claim 11, wherein the ring portion includes a plurality of mounting holes in a top surface of the ring portion, the mounting holes aligning with openings in the cutter housing.

13. The belt cover of claim 11, wherein the guard portion includes a vertical wall portion along a leading edge in a direction of movement of the cutter.

14. The belt cover of claim 11, wherein the guard portion includes a bottom surface that slopes upwards toward a trailing edge that contacts a bottom surface of the cutter housing.

15. The belt cover of claim 11, wherein the at least one tab includes three tabs.

16. The belt cover of claim 11, wherein the at least one tab forms an interference fit with the corresponding pocket.

17. A method of assembling a lawnmower, comprising:
    mounting a motor having a motor shaft on top of a cutter housing, the cutter housing defining a lower opening, a belt opening between the motor shaft and a rear axle, and at least one discharge opening;
    mounting a belt on the motor shaft and on a transmission coupled to the rear axle;
    positioning a belt cover including a ring portion at least partially surrounding the motor shaft, the belt cover including a guard portion extending rearward toward the belt opening below the belt, wherein the guard portion includes at least one tab extending from a rearward edge;
    inserting the at least one tab into a corresponding pocket on the cutter housing adjacent the belt opening; and
    securing the ring portion to a bottom surface of the cutter housing with a plurality of fasteners.

18. The method of claim 17, wherein the cutter housing comprises:
    a dome-shaped top cover extending above and around the cutter to define the lower opening and a rear opening; and
    a rear assembly positioned within the rear opening and defining the belt opening and the at least one discharge opening, the method further comprising mounting the rear assembly to the domed top cover.

19. The method of claim 18, wherein securing the ring portion to a bottom surface of the cutter housing comprises securing the ring portion to the domed top cover.

20. The method of claim 17, further comprising mounting a cutter at an end of the motor shaft below the belt cover.

* * * * *